United States Patent
Harres (10) Patent No.: US 7,011,453 B1
(45) Date of Patent: Mar. 14, 2006

(54) METHOD FOR DETERMINING FIBER OPTIC FAULT LOCATION

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/008,468

(22) Filed: Dec. 9, 2004

(51) Int. Cl.
*G02B 6/26* (2006.01)
*G02B 6/00* (2006.01)
*H04B 10/08* (2006.01)
*G01N 21/00* (2006.01)

(52) U.S. Cl. .................. 385/53; 356/73.1; 385/12; 398/10; 398/17; 398/21

(58) Field of Classification Search ............ 398/10–24
See application file for complete search history.

(56) References Cited

U.S. PATENT DOCUMENTS

| 4,833,668 | A | * | 5/1989 | Rowley et al. ................ 398/21 |
| 5,093,568 | A | * | 3/1992 | Maycock ................ 250/227.14 |
| 5,530,546 | A | * | 6/1996 | Barringer et al. .......... 356/73.1 |
| 5,809,187 | A | | 9/1998 | Peck, Jr. et al. |
| 6,381,011 | B1 | * | 4/2002 | Nickelsberg et al. ...... 356/73.1 |
| 2002/0025124 | A1 | | 2/2002 | Green et al. |
| 2004/0062553 | A1 | | 4/2004 | Harres |
| 2004/0071438 | A1 | | 4/2004 | Harres et al. |

OTHER PUBLICATIONS

U.S. Appl. No. 10/845,398, filed May 13, 2004, Harres.
U.S. Appl. No. 10/644,124, filed Aug. 20, 2003, Harres.
U.S. Appl. No. 10/722,688, filed Nov. 24, 2003, Harres.
U.S. Appl. No. 10/788,987, filed Feb. 27, 2004, Harres.
Panock, Forrest, Kohl, Dewinter, Nahory, Yanowski; An Experimental Low-Loss Single-Wavelength Bidirectional Lightwave Link; IEEE; Journal of Lightwave Technology, vol. LT-2, No. 3, Jun. 1984; 6 pages.

* cited by examiner

*Primary Examiner*—Michelle Connelly-Cushwa
*Assistant Examiner*—Chris Chu
(74) *Attorney, Agent, or Firm*—Thompson Coburn LLP (57) ABSTRACT

Methods and apparatus for detecting degradation of a fiber optic connector. In a preferred embodiment, the method includes transmitting a optical pulse in a first direction along the fiber optic cable such that a first portion of the optical pulse is either absorbed or reflected by the degradation. The method also includes determining the degradation's location within at most two connectors of the cable based on the first portion of the optical pulse. If the at most two connectors is two connectors then the method includes transmitting a second optical pulse in a second direction along the cable so that a portion of the second optical pulse is either absorbed or reflected by the degradation. A determination is made of the location of the degradation within one of the two connectors based on the first portion and the second portion of the optical pulses.

13 Claims, 3 Drawing Sheets

METHOD FOR DETERMINING FIBER OPTIC FAULT LOCATION

STATEMENT REGARDING FEDERALLY SPONSORED RESEARCH OR DEVELOPMENT

This invention was developed in the course of work under U.S. government contract F33615-03-M-3339. The U.S. government may possess certain rights in the invention.

FIELD OF THE INVENTION

This invention pertains to optical time domain reflectometers and to the use of such devices in determining the location of degraded portions of fiber optic cables. More particularly, this invention pertains to an optical time domain reflectometer for detecting and locating degraded fiber optic cable connectors.

BACKGROUND OF THE INVENTION

It is well known in the field of fiber optics that a damaged portion of a fiber optic cable will reflect at least a portion of the light traveling along the cable, back along the cable in a direction opposite the direction from which such light came. Using this phenomenon, optical time domain reflectometers (OTDR(s)) are able to locate damaged portions of fiber optic cables, at least to within a given range distance relative to known points along such cables. OTDRs typically operate by sending a very short-duration, high-power laser pulse along the optical cable, and by thereafter observing the returned reflections from the pulse. Although portions of the pulse are also reflected back by such things as connectors that are used to join individual sections of a fiber optic cable, by comparing the observed time domain reflection response to the time domain response that would be expected had the cable not been damaged, the portion of the pulse reflected by the damaged portion of the cable can be ascertained. The time delay between the emission of the laser pulse and the detection of its partial reflection back from the damaged portion of the cable can then be utilized to determine how far such light traveled, and hence the distance to the damaged portion.

The fiber optic cables are typically composed of long sections of clad fiber with connectors at either end to optically and mechanically couple one section of cable to the next and to connect the cable to fiber optic components (e.g. transmitters and receivers). These connectors are susceptible to damage, contamination, and other types of degradation. Depending on the type of degradation, the connector will either reflect or absorb, or both, an amount of electromagnetic energy (e.g. light) that would otherwise be transmitted through the connector. A connector that is contaminated with grease, for example, might exhibit mostly absorption. Another connector contaminated with a pollen grain(s) might exhibit some reflection as well as some absorption. An improperly seated connector might be almost entirely reflective. If the amount of energy absorbed or reflected is too great, the degradation causes the cable to fail. If instead the amount of energy is not enough to completely fail the cable, the degradation decreases the signal to noise ratio of the cable and, accordingly, limits the cable's bandwidth.

Thus, a need exists for improved methods of, and apparatus for, detecting and positively locating degraded fiber optic connectors.

SUMMARY OF THE INVENTION

It is in view of the above problems that the present invention was developed. The invention provides apparatus and method for detecting and locating degraded fiber optic cable connectors.

Optical Time Domain Reflectometers (OTDRs) have considerable utility in Built-In Test applications of fiber optic links. OTDRs send a short optical pulse down the fiber and then observe the reflections that return. Such a function allows the fiber optic system to self-diagnose faults, determining where breaks and obstructions exist in the system. The operation of an OTDR is straightforward when the fault is a cable break, in which case a substantial reflection occurs, but the ability of an OTDR to detect the location of a degraded connector (e.g. a connector) is not straightforward. Since connector contamination is a common problem in aerospace fiber optic systems, the ability to correctly identify degraded fiber optic connectors is important.

In a first preferred embodiment, the present invention provides a method that includes transmitting a laser pulse in a first direction along the fiber optic cable such that a first portion of the laser pulse is either absorbed or reflected by the degradation. The method also includes determining the degradation's location within at most two connectors of the cable based on the first portion of the laser pulse. If the at most two connectors is two connectors then the method includes transmitting a second laser pulse in a second direction along the cable so that a portion of the second laser pulse is either absorbed or reflected by the degradation. A determination is made of the location of the degradation within one of the two connectors based on the first portion and the second portion of the laser pulses. Preferably, in addition to determining the location of the degradation, a determination is made regarding whether the degradation absorbed or reflected the laser pulses, or both. Likewise, it is preferred that the number of connectors between an end of the fiber optic cable and the location of the degradation is determined. Further, the length of cable between the end of the fiber optic cable and the location of the degradation can be determined. Also, the degradation can be repaired by, for example, cleaning or replacing the degraded connector. After the repair, the cable can be returned to service and information transmitted along the cable.

In a second preferred embodiment, the present invention provides a fiber optic system. The system includes a fiber optic cable, at least two connectors of the cable, at least one laser pulse source, and a circuit. The cable connectors are, of course, susceptible to degradation. The laser pulse source is coupled with the fiber optic cable and transmits a laser pulse in a direction along the fiber optic cable so that a portion of the first laser pulse is either absorbed or reflected back along the fiber optic cable in a second direction opposite the first direction by the degradation. The detector is coupled with the fiber optic cable, detects the laser pulse, and generates a signal indicative of the as-received laser pulse. Using the signal, the circuit determines the location of the degradation within at most two connectors of the at least two connectors. If the at most two connectors is only one connector, then the circuit indicates that the location of the degradation is within the only one connector. If the at most two connectors is two connectors, then the circuit causes the laser pulse source to transmit a second laser pulse in a second direction along the fiber optic cable so that at least a second portion of the second laser pulse is at either absorbed or reflected back along the fiber optic cable by the degradation. Also, the circuit determines that the location of the degradation is within the only one connector based on the first portion of the first laser pulse and the second portion of the second laser pulse. The circuit also indicates in which connector the degradation is located.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate exemplary embodiments of the present invention and together with the description, serve to explain the principles of the invention. In the drawings.

DETAILED DESCRIPTION OF THE PREFERRED EMBODIMENTS

Fiber optic connector faults cause either a reflection of the electromagnetic energy (hereinafter "light") being transmitted through the connector or an absorption of the light or both. Reflections are relatively easy to detect when repetitive measurements of the reflection are made. Co-owned U.S. patent application Ser. No. 10/722,688, entitled Optical Time Domain Reflectometer And Method of Using the Same, by Harres, and filed on Nov. 24, 2003, discloses methods and apparatus for detecting reflective faults and is incorporated herein as if set forth in full. Additional fiber optic methods and apparatus are disclosed in co-owned U.S. patent application Ser. No. 10/845,398, entitled Mixer-Based In-Service Time Domain Reflectometer Apparatus and Methods, by Harres, and filed on May 13, 2004 which is also incorporated by reference as if set forth in full.

Even small reflective losses on the order of 0.1 dB (which correspond to approximately a 2% loss) can be detected if repeated measurements are made to take advantage of the improvement in the signal to noise ratio (i.e. measurement to noise ratio) with increasing numbers of measurements. Small absorptive losses can similarly be detected. However, if a cable suffers from both reflective and absorptive faults, detecting and locating either type of fault becomes problematic. One of the reasons that the detection of the faults becomes difficult is that reflections in the fiber occurring after the absorptive fault will be reduced by the amount of absorption (in dB). The reflective fault(s) are therefore masked by the presence of the absorptive fault.

Figure 1:
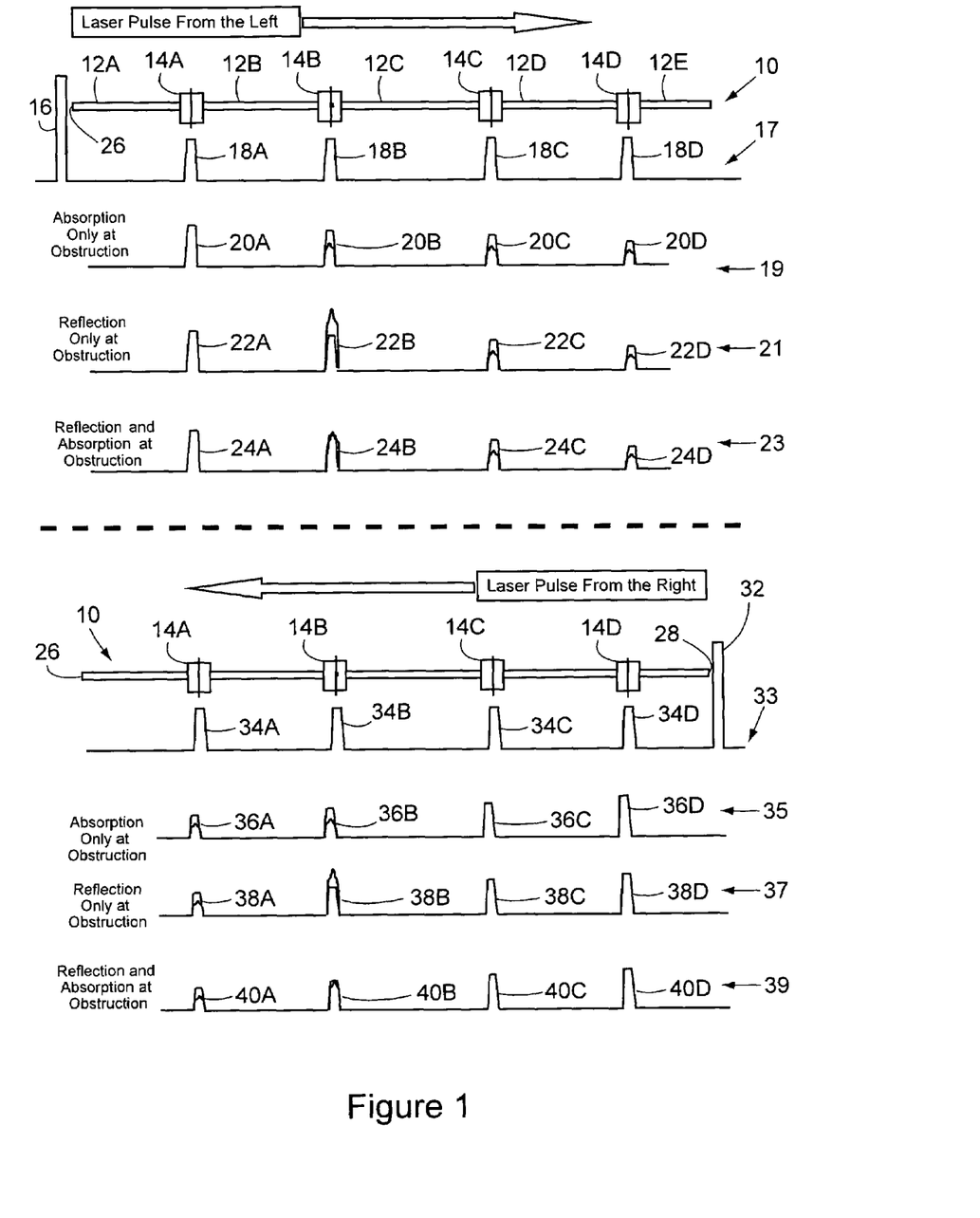
FIG. 1 illustrates a fiber optic cable with a plurality of connectors.

Referring to the accompanying drawings in which like reference numbers indicate like elements, FIG. 1 illustrates typical fiber optic connector faults. FIG. 1 illustrates a fiber optic cable 10 that includes a plurality of sections 12 each of which is connected to adjacent sections 12 by connectors 14. Also, the end sections 12A and 12E can include a connector for connecting to other fiber optic equipment such as fiber optic transmitters and receivers (not shown). Ideally the sections 12 are composed of a transparent core surrounded by a cladding with a lower index of refraction than the index of refraction of the core. Accordingly, the sections 12 are well suited to transmitting light along the cable without significant loss. Ideally, the connectors 14 mechanically and optically couple adjacent sections 12 in such a manner that the connectors cause only an insignificant loss of the light being transmitted along the cable 10.

In reality, each connector 14 (even absent degradation) tends to reflect some light back along the cable 10 in the direction from which the light was transmitted. Thus, if a pulse of laser light 16 is coupled into the cable 10 at one end 26, the laser pulse 16 will travel along the cable 10 encountering the connectors 14 and partially reflecting back toward the end 26 at each connector. The reflections 18 from the connectors travel back from the connectors 14 to the end 26 where the laser pulse 16 was coupled into the cable 10. Thus, the laser pulse 16 causes a wave form 17 with reflective pulses 18A to 18D arriving at the end 26 of the cable 10 in that order and separated by the amount of time it took the light to travel the length of the cable 10 between the corresponding connectors 14.

Wave form 19 shows the effect that an absorptive degradation of connector 14B causes. While the laser pulse 16 causes a reflection 20A from the connector 14A in a nominal fashion, the pulse 16 is partially absorbed by the degraded connector 14B. Accordingly, the reflection 20B from the degraded connector 14B is attenuated by the contamination, or other cause of the degradation of connector 14B. The, now attenuated, laser pulse 16 continues traveling along the cable 10 and encounters connector 14C and then connector 14D. Because the incident light at these subsequent connectors 14C and 14D is attenuated, the reflections 20C and 20D exhibit an attenuated amplitude or intensity as shown in FIG. 1 at wave form 19. Assuming that no other degraded connectors are present, it is possible to positively identify the connector 14B as the location of the degradation based on the presence of the first attenuated reflection 20B that corresponds to the connector 14B.

Wave form 21 shows the effect that a reflective degradation of connector 14B causes. The first affected reflection 22B shows a higher than nominal amplitude because the reflection from the source of the degradation superimposes on the nominal reflection from the connector 14B. However, the reflections 22C and 22D from the subsequently encountered connectors are attenuated because the laser pulse 16 leaving the degraded connector 14B is attenuated by the amount of the reflection from the source of the degradation (in addition to the nominal attenuation caused by the connector 14B). Assuming that no other degraded connectors are present, then it is possible to positively identify the connector 14B as the location of the reflective degradation due to the presence of the more intense reflection 22B followed by the attenuated reflections 22C and 22D.

Thus, in the absence of other degraded connectors 14 and in the presence of a degraded connector characterized substantially by either reflectance or absorption, it is possible to positively locate degraded connectors. If a reflection is attenuated, the corresponding connector suffers from a degradation characterized by absorption. If a reflection is larger, or more intense, than nominal and is followed by an attenuated reflection, the connector that corresponds to the accentuated reflection is the location of a reflective degradation.

However, where the source of the degradation causes both reflectance and absorption, the previously stated rules for locating the fault, or degradation, can fail. Wave form 23 shows this situation. For wave form 23 the connector 14B has a fault that causes both a reflection and absorption. Thus, when the laser pulse 16 arrives at the connector 14B the increase in the reflection (due to the reflectance of the degradation) is canceled by the attenuation due to the degradation. The resulting reflection 24B approximates a nominal reflection such as reflection 18B. Subsequent reflections 24C and 24D will exhibit an attenuated amplitude because of the absorbed light at connector 14B. Only a close examination of the reflection 24B might be able to identify the alteration caused to the reflection 24B by the degradation. Instead, what is likely to happen is that the attenuation of the subsequent reflections 24C and 24D will be noted. Accordingly, it will be concluded that connector 14C (that corresponds to the first attenuated reflection 24C) will be incorrectly identified as the location of the degradation. Further, the degradation will be incorrectly identified as a purely absorptive degradation. Thus, not only the location, but also the likely source of the root cause, of the problem will be mis-identified. Clearly in such situations, the wrong connector will be replaced, cleaned, or otherwise repaired thereby leaving the degraded connector 14B in service without corrective action.

With the possibility that some sources of degradation cause both reflectance and absorption of the light arriving at a connector 14, it is only possible to locate the source of the degradation to one of two connectors: the connector exhibiting the first attenuated reflection or the previous connector (here, respectively, connectors 14C and 14B).

However, in accordance with the principles of the present invention, if another laser pulse 32 is coupled into the cable 10 from the end 28 (in contrast to laser pulse 16 which is coupled into the cable 10 at the end 26) it is possible to positively locate the connector 14B as the location of the degradation. With continued reference to FIG. 1, the effects of laser pulse 32 are illustrated. If no connectors suffer from degradation the wave form 33 results and includes a series of nominal reflections 34. However, if connector 14B is degraded with a source that causes only attenuation then reflection 36B and subsequent reflections 36A will be attenuated. If connector 14B reflects more light than is normal, the result is that an accentuated reflection 38B is associated with the faulty connector 14B and subsequent reflections 38A will be attenuated. If, however, connector 14B is degraded by a contaminate (or otherwise) that causes both reflection and absorption, the resulting wave form 39 includes a reflection 40B that appears nominal and a subsequent reflection 40A that is attenuated. Therefore, a connector suffering a degradation characterized by both reflectance and absorption can be identified from the pattern revealed by wave forms 23 and 39. That is, the affected connector 14B is positively identified as the source of the dual nature degradation if transmitting a pulse of light 16 from one direction causes an attenuated subsequent reflection 24C (corresponding to connector 14C) and transmitting a pulse of light 32 in the opposite direction causes an attenuated reflection 40A corresponding to a different subsequent connector 14A. Where the different pulses of light 16 and 32 reveal different subsequent connectors (14A and 14C), the connector that is suffering from a dual nature degradation is the connector 14B between the two connectors 14A and 14C.

Another manner in which to phrase the novel rule for identifying the degrading connector is as follows. The intersection of two sets of potentially degraded connectors identifies the actual degraded connector when the sets of connectors are identified by transmitting light pulses along the cable in opposite directions.

Figure 2:
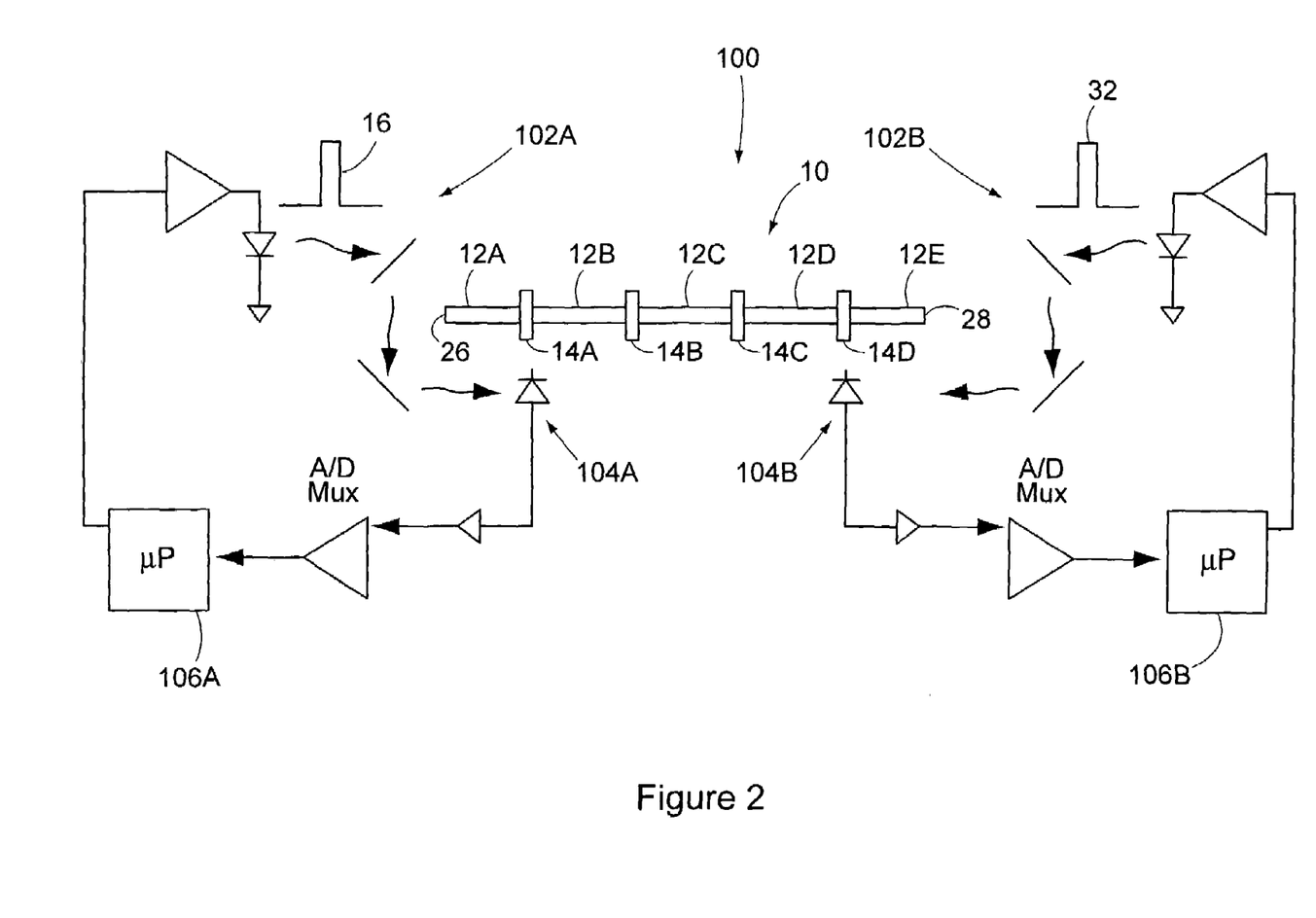
FIG. 2 schematically illustrates a circuit constructed in accordance with a preferred embodiment of the present.

FIG. 2 illustrates a pair of OTDRs constructed in accordance with the principles of the present invention. The OTDRs of the current embodiment each include a light source 102, a photo detector 104, a microprocessor 106, and associated signal conditioning and amplification circuitry interconnected as shown. In addition, the light sources 102A and 102B are preferably laser diodes (or equivalents thereof) that are optically coupled to the opposite ends 26 and 28 of the fiber optic cable 10. The photo detectors 104A and 104B are preferably photo diodes and are also optically coupled to the ends 26 and 28 of the cable 10. In operation, one of the microprocessors 106A generates a signal to trigger the light source 102A that converts the signal to the light pulse 16. The light pulse 16 travels along the fiber optic cable 10 encountering the connectors 14 thereby causing reflections that travel back to the detector 104A. In turn, the detector 104A transforms the arriving wave form to a signal that is communicated to the microprocessor 106A. From the signal that represents the as-received wave form, the microprocessor 106A determines which two connectors (if any) might be subject to a fault that either attenuates or reflects light, or both.

If the as-received wave form indicates that more than one connector (i.e. two adjacent connectors, for example 14B and 14C) might be subject to a fault, then the microprocessor 106A signals the other microprocessor 106B to trigger light source 102B to generate the pulse of light 32. Microprocessor 106A also communicates to the other microprocessor 106B which of the connectors are suspected of containing the fault. In a preferred embodiment, the microprocessors 106A and 106B are able to communicate over the fiber optic cable 10 even in the presence of a fault(s) in the connector because the communications are sent at a very low rate. The low rate allows the detectors 104A and 104B to detect the communications even in the presence of a substantial degradation of the cable 10. Apparatus and methods of communicating in this manner are taught in co-owned U.S. patent application Ser. No. 10/644,124, entitled Apparatus and methods For Fiber Optic Link With Built In-Test, by Harres, and filed on Aug. 20, 2003 which is also incorporated by reference as if set forth in full. The pulse of light 32 enters the cable 10 at end 28 (in contrast to the previous light source which is coupled end 26). The detector 104B then converts the reflections associated with the second light pulse 32 to a signal that is communicated to the microprocessor 106B. The microprocessor 106B determines if the shape of the as-received wave form indicates that one of a pair of connectors (for example 14B and 14A) might be suffering from a dual nature degradation. If so, the microprocessor 106B then indicates that the connector at the intersection of the two sets of connectors (connector 14B) is the location of the degradation. If only a substantially reflective or absorptive degradation is detected, then the microprocessor indicates which connector suffers from that single nature degradation.

Figure 3:
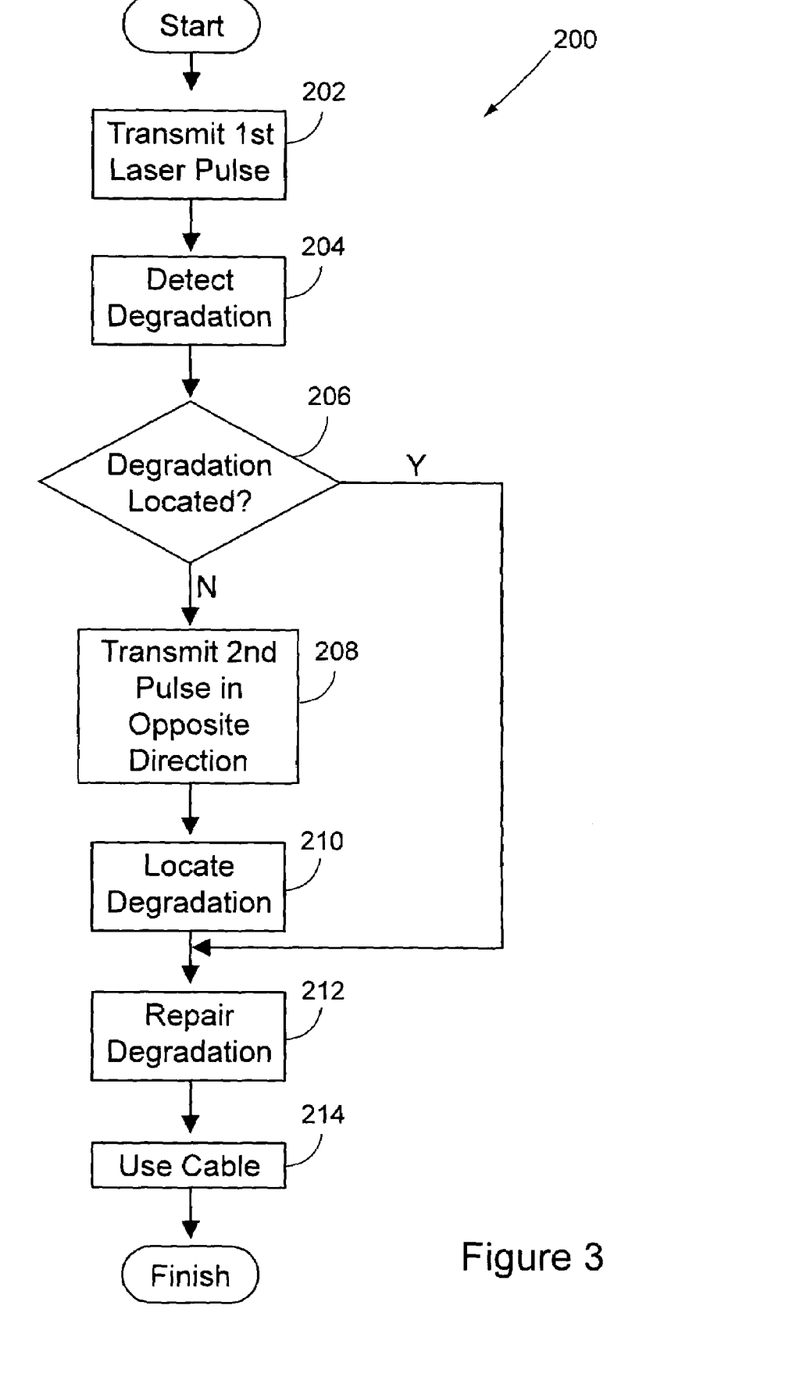
FIG. 3 illustrates a method in accordance with the principles of the present invention.

FIG. 3 shows a flowchart of a method in accordance with the principles of the present invention. The method 200 generally includes detecting the presence of a degraded connector from one end of a fiber optic cable, detecting the degraded connector from the other end of the cable, and positively locating the degraded connector. The first operation illustrated, operation 302, shows a laser pulse being transmitted in a first direction along a fiber optic cable. As the laser pulse travels the length of the cable, it encounters connectors and causes reflections of light from those connectors. Depending on the presence, and nature, of the faults that are present, some of the reflections may have attenuated amplitudes or accentuated amplitudes. If all of the connector reflections are within a pre-selected tolerance of a nominal reflection the cable is declared as being satisfactory. If an accentuated reflection is detected along with subsequent attenuated reflections, then the location of the degradation is positively identified as being at the connector that corresponds to the accentuated reflection. See operation 206 where it is determined whether the degradation can be positively located using a laser pulse from one end of the cable. On the other hand, if only attenuated reflections are detected, it remains to be determined whether the attenuated reflections were caused by a substantially absorptive degradation or a dual nature degradation.

Accordingly, a second laser pulse is generated and coupled into the cable from the opposite direction as the first laser pulse. See operation 208. The reflections from the second pulse are then examined. As noted before, in these circumstances, the first pulse identifies one pair of adjacent connectors that includes the location of the degradation and the second pulse identifies a second pair of adjacent connectors that includes the location of the degradation. From the intersection of the two pairs of connectors, the common connector is positively identified as the location of the degradation as in operation 210. Whether the degraded connector is identified using one pulse, or two pulses, the degraded connector can be repaired. See operation 212. With the connector repaired, the cable can be used to transmit information at a high rate as in operation 214.

In view of the foregoing, it will be seen that the several advantages of the invention are achieved and attained. Optical apparatus and methods have been provided for detecting and positively locating fiber optic connectors that are subject to substantially absorptive, substantially reflective, or dual nature (partially absorptive and partially reflective) degradation. Thus, less time and effort will be expended in repairing or refurbishing fiber optic cables that include such connectors. Also, affected fiber optic systems will enjoy greater reliability, higher signal to noise ratios, and fewer service interruptions because of the ability to positively locate connectors that experience dual nature degradation.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while FIG. 2 shows a pair of OTDRs coupled to the opposite ends of a cable, one preferred embodiment includes a single OTDR coupled to both ends of the cable and capable of transmitting optical pulses in both directions along the cable. Thus, the breadth and scope of the present invention should not be limited by any of the above-described exemplary embodiments, but should be defined only in accordance with the following claims appended hereto and their equivalents.

What is claimed is:

1. A method of detecting degradation of a fiber optic cable connector wherein the fiber optic cable has at least two connectors, the method comprising:
   transmitting a first optical pulse in a first direction along the fiber optic cable in a manner such that at least a first portion of the first optical pulse is at least one of absorbed or reflected back along the fiber optic cable in a second direction opposite the first direction by the degradation;
   determining a location of the degradation within at most two connectors of the at least two connectors based on the first portion of the first optical pulse;
   if the at most two connectors is only one connector, then determining that the location of the degradation is within the only one connector; and
   if the at most two connectors is two connectors then
      transmitting a second optical pulse in the second direction along the fiber optic cable in a manner such that at least a second portion of the second optical pulse is at least one of absorbed or reflected back along the fiber optic cable in the first direction by the degradation, and
      determining the location of the degradation within the only one connector based on the first portion of the first optical pulse and the second portion of the second optical pulse.

2. The method according to claim 1, further comprising determining whether the first portion of the first optical pulse was absorbed, reflected back, or both.

3. The method according to claim 1, further comprising determining a number of connectors between an end of the fiber optic cable and the location of the degradation.

4. The method according to claim 1, further comprising determining a length between an end of the fiber optic cable and the location of the degradation.

5. The method according to claim 1, further comprising using a single optical pulse source to generate the first optical pulse and the second optical pulse.

6. The method according to claim 1, further comprising repairing the degradation.

7. The method according to claim 1, further comprising transmitting information along the fiber optic cable after the repairing.

8. A fiber optic system comprising:
   a fiber optic cable;
   at least two connectors of the fiber optic cable, at least one of the two connectors being susceptible to degradation with a location;
   at least one optical pulse source coupled with the fiber optic cable for transmitting a first optical pulse in a first direction along the fiber optic cable in a manner such that at least a first portion of the first optical pulse is at least one of absorbed or reflected back along the fiber optic cable in a second direction opposite the first direction by the degradation;
   at least one optical pulse detector coupled with the fiber optic cable for detecting the first optical pulse as received at the detector and generating a signal indicative of the as-received first optical pulse; and
   a circuit for:
      communicating with the optical pulse detector for accepting the signal indicative of the as-received first optical pulse,
      determining the location of the degradation within at most two connectors of the at least two connectors based on the signal indicative of the as-received first optical pulse;
      if the at most two connectors is only one connector, then indicating that the location of the degradation is within the only one connector,
      if the at most two connectors is two connectors, then causing the at least one optical pulse source to transmit a second optical pulse in the second direction along the fiber optic cable in a manner such that at least a second portion of the second optical pulse is at least one of absorbed or reflected back along the fiber optic cable in the first direction by the degradation, determining that the location of the degradation is within the only one connector based on the first portion of the first optical pulse and the second portion of the second optical pulse, and indicating that the location of the degradation is within the only one connector.

9. The system according to claim 8 further comprising the circuit for determining whether the first portion of the first optical pulse was one of absorbed, reflected back, or both based on the signal indicative of the first portion of the first optical pulse.

10. The system according to claim 8 further comprising the circuit further for determining a number of connectors between an end of the fiber optic cable and the only one connector based on the signal indicative of the as-received first optical pulse.

11. The system according to claim 8 further comprising the circuit further for determining a length between an end of the fiber optic cable and the only one connector based on the signal indicative of as-received first optical pulse.

12. The system according to claim 8 further comprising the at least one optical pulse source being one pulse source.

13. The system according to claim 8, further comprising at least one of a light transmitter or a light receiver coupled with the fiber optic cable for, respectively, transmitting or receiving light along the fiber optic cable.

* * * * *

UNITED STATES PATENT AND TRADEMARK OFFICE
CERTIFICATE OF CORRECTION

PATENT NO.        : 7,011,453 B1                                               Page 1 of 1
APPLICATION NO. : 11/008468
DATED             : March 14, 2006
INVENTOR(S)       : Daniel N. Harres It is certified that error appears in the above-identified patent and that said Letters Patent is hereby corrected as shown below:

In column 1, in line 8, after "U.S. government contract F33615-03-M-3339," insert -- and this invention was made with government support under N00019-04-C-0005 awarded by the United States Navy. --

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,011,453 B1 | Page 1 of 1 |
| APPLICATION NO. | : 11/008468 | |
| DATED | : March 14, 2006 | |
| INVENTOR(S) | : Daniel N. Harres | |

It is certified that error appears in the above-identified patent and that said Letters Patent is hereby corrected as shown below:

Column 1, line 8, after "U.S. government contract F33615-03-M-3339," insert -- and this invention was made with government support under N00019-04-C-0005 awarded by the United States Navy. --

Signed and Sealed this

Fifth Day of September, 2006

JON W. DUDAS
*Director of the United States Patent and Trademark Office*